(12) United States Patent
Doi (10) Patent No.: US 10,967,471 B2
(45) Date of Patent: Apr. 6, 2021

(54) CHUCK DEVICE

(71) Applicants: BIG DAISHOWA CO., LTD., Osaka (JP); BIG DAISHOWA SEIKI CO., LTD., Osaka (JP)

(72) Inventor: Masayuki Doi, Osaka (JP)

(73) Assignees: Big Daishowa Co., Ltd., Osaka (JP); Big Daishowa Seiki Co., Ltd., Osaka (JP)

( * ) Notice: Subject to any disclaimer, the term of this patent is extended or adjusted under 35 U.S.C. 154(b) by 0 days.

(21) Appl. No.: 16/605,390

(22) PCT Filed: Apr. 28, 2017

(86) PCT No.: PCT/JP2017/017062
§ 371 (c)(1),
(2) Date: Oct. 15, 2019

(87) PCT Pub. No.: WO2018/198362
PCT Pub. Date: Nov. 1, 2018

(65) Prior Publication Data
US 2020/0039015 A1 Feb. 6, 2020

(51) Int. Cl.
*B23Q 11/10* (2006.01)
*B23Q 3/12* (2006.01)

(52) U.S. Cl.
CPC .......... *B23Q 11/10* (2013.01); *B23B 2231/24* (2013.01); *B23Q 3/12* (2013.01); *B23Q 11/1023* (2013.01); *Y10T 279/17111* (2015.01)

(58) Field of Classification Search
CPC . B23B 2231/24; B23B 2250/12; B23Q 11/10; B23Q 11/1023; B23Q 11/1076;
(Continued)

(56) References Cited

U.S. PATENT DOCUMENTS 4,213,354 A 7/1980 Dahinden
4,669,933 A 6/1987 Dye
(Continued)

FOREIGN PATENT DOCUMENTS

EP 2 202 019 61 3/2018
JP S54-51080 A 4/1979
(Continued)

OTHER PUBLICATIONS

Translation of JP S61-184646U, Kaneya et al. (dated Nov. 18, 1986), USPTO, Jan. 2021, (Year: 2021).*
(Continued)

*Primary Examiner* — Eric A. Gates
*Assistant Examiner* — Chwen-Wei Su
(74) *Attorney, Agent, or Firm* — Dilworth & Barrese, LLP (57) ABSTRACT

Provided is a chuck device that allows appropriate and easy setting of a discharging direction of working fluid. A chuck device configured to be attached to a spindle of a machine tool for gripping a cutting tool, in which inside the chuck device, there are provided a passage in which a working fluid flows and a discharge opening provided at a leading end opening of the passage through which the working fluid is discharged toward to the cutting tool. A discharging direction of the working fluid from the discharge opening is set opposite to a rotational direction of the cutting tool and set with a tilt of an angle calculated by a mathematical formula to a tangential direction of a rotation trajectory of the center of the discharge opening relative to a direction of an axis of the cutting tool.

4 Claims, 4 Drawing Sheets

(58) Field of Classification Search
CPC .................. B23Q 11/1015; B23Q 3/12; Y10T 279/17111
See application file for complete search history.

(56) References Cited

U.S. PATENT DOCUMENTS

| | | | |
|---|---|---|---|
| 4,795,292 A | | 1/1989 | Dye |
| 5,358,360 A | | 10/1994 | Mai |
| 5,405,155 A | * | 4/1995 | Kanaan ................. B23B 31/001 279/157 |
| 8,393,830 B2 | | 3/2013 | Hideta |
| 8,622,061 B2 | | 1/2014 | Zhang et al. |
| 8,939,685 B2 | | 1/2015 | Cigni |
| 9,604,286 B2 | | 3/2017 | Takai |
| 9,623,490 B2 | | 4/2017 | Takai |
| 2015/0048576 A1 | * | 2/2015 | Lee ..................... B23B 31/1075 279/20 |
| 2017/0072475 A1 | * | 3/2017 | Haimer ................. B23B 31/005 |

FOREIGN PATENT DOCUMENTS

| | | |
|---|---|---|
| JP | S61-184646 U | 11/1986 |
| JP | H06-134647 A | 5/1994 |
| JP | H6-63207 U | 9/1994 |
| JP | H7-17452 U | 3/1995 |
| JP | H08-99245 A | 4/1996 |
| JP | H08-112731 A | 5/1996 |
| JP | 2000-308965 A | 11/2000 |
| JP | 2002-224930 A | 8/2002 |
| JP | 2004-148429 A | 5/2004 |
| JP | 2014-076537 A | 5/2014 |
| JP | 5512386 B2 | 6/2014 |
| JP | 5926877 62 | 5/2016 |
| JP | 5951113 B2 | 7/2016 |
| TW | 200916239 A | 4/2009 |
| TW | 201714698 A | 5/2017 |

OTHER PUBLICATIONS

Translation of the International Preliminary Report on Patentability from PCT/JP2017/017062 and Notification of Transmittal dated Nov. 7, 2019.
Taiwan Office Action dated Jul. 17, 2020.
Korean Office Action dated Dec. 11, 2020.

* cited by examiner

CHUCK DEVICE

TECHNICAL FIELD

This invention relates to a chuck device capable of supplying working fluid to a cutting tool.

BACKGROUND ART

A chuck device is attached to a spindle of a machine tool and used for holding the cutting tool. In such chuck device, a passage of the working fluid is sometimes provided for supplying a necessary amount of working fluid from this passage to the cutting tool engaged in a cutting work. The working fluid referred to herein is liquid or gas to be supplied for such purpose as cooling of a cutting edge which becomes heated due to friction with a work to be machined or flushing away cutting or milling debris. For allowing such working fluid to be supplied to a cutting tool engaged in a cutting work, chuck devices provided with variety of improvements have been developed.

For instance, in the case of a chuck device disclosed in PTL 1, in order to discharge working fluid through a nozzle hole to a cutting edge, the nozzle hole is formed obliquely to be directed to a target working point of the cutting tool. Working fluid discharged from the chuck device in the course of a cutting work is exposed to a rotational force of the chuck device. However, by discharging the working fluid from the nozzle hole toward the axis of the cutting tool, the influence of the rotational force of the chuck to the discharged working fluid is lessened.

Yet, with the chuck device disclosed in PTL 1, since the nozzle hole is provided at a position away from the cutting tool, there is a risk of the working fluid being scattered away before reaching the cutting tool. To solve this problem, it is conceivable e.g. to increase the discharging pressure of the working fluid. In this case, however, there is a need to improve the pressure-resistant performance of the chuck device as a whole, so the manufacture cost of the chuck device will increase. Further, if the discharging pressure is increased, the fluid pressure of the working fluid applied to the cutting tool is increased also. For this reason, the working fluid supplied to the cutting tool may be bounced back from the cutting tool to be scattered about, so that a sufficient amount of the working fluid may not be supplied to the cutting edge.

In view of the above, in a chuck device disclosed in PTL 2, the present applicant proposed an arrangement in which a passage is provided for supplying working fluid to a cutting tool and the discharging direction of the working fluid is set opposite to the rotational direction.

CITATION LIST

Patent Literature

PTL 1: Publication Document of Unexamined Japanese Patent Application No. 2004-148429
PTL 2: Publication Document of Unexamined Japanese Patent Application No. 2014-76537

SUMMARY OF INVENTION

Technical Problem

With the chuck device disclosed in PTL 2, since the discharging direction of the working fluid is set opposite to the rotational direction, the influence of the rotational force of the chuck device affecting the working fluid can be further lessened. With this, it is possible to reduce the amount of scattering of the discharged working fluid to the radial outer side of the cutting tool, as a result, a large amount of the working fluid can be supplied to the cutting tool. However, for effective reduction in the scattering amount of the work fluid described above, there has remained room for improvement in setting the discharging direction of the working fluid in the chuck device appropriately.

The present invention has been made in view of the above-described state of the art and its principal object is to provide a chuck device that allows appropriate and easy setting of the discharging direction of the working fluid.

Solution to Problem

According to a characterizing feature of a chuck device relating to the present invention, there is provided a chuck device configured to be attached to a spindle of a machine tool for gripping a cutting tool, wherein;

inside the chuck device, there are provided a passage in which a working fluid flows and a discharge opening provided at a leading end opening of the passage through which the working fluid is discharged toward to the cutting tool; and a discharging direction of the working fluid from the discharge opening is set opposite to a rotational direction of the cutting tool and set with a tilt of an angle θ calculated by a following formula to a tangential direction of a rotation trajectory of the discharge opening relative to a direction of an axis of the cutting tool;

$$\theta = \sin^{-1}((n \times Dc \times \pi)/(12 \times 10^5 \times \sqrt{5P})) \quad \text{[Formula 1]}$$

n: rotational speed of chuck device (min$^{-1}$)
Dc: diameter of virtual circle defined by rotation trajectory of center of discharge opening (mm)
P; working fluid pressure at discharge opening (MPa)
π: circular constant With the above-described configuration in which the chuck device includes therein a passage in which a working fluid flows and a discharge opening communicated to the passage and a discharging direction of the working fluid from the discharge opening is set opposite to a rotational direction of the cutting tool, it is possible to lessen the influence of the rotational force of the chuck device to the working fluid. Further, with the inventive configuration, the discharging direction of the working fluid from the discharge opening is set with a tilt of an angle θ to a tangential direction of a rotation trajectory of the discharge opening relative to a direction of an axis of the cutting tool and there is provided a mathematical formula for calculating an appropriate angle θ. Therefore, by using such angle θ calculated by the mathematical formula, the discharging direction of the working fluid can be set appropriately and easily also in the chuck device.

According to a further characterizing feature of the present invention, the discharging direction is set to be directed toward the axis of the cutting tool.

With the above-described arrangement of the discharging direction being set to be directed toward the axis of the cutting tool, the working fluid discharged from the discharge opening can be easily supplied toward the cutting tool.

According to a still further characterizing feature of the present invention, the angle θ is set to from 0.9 degree to 55.9 degrees when a circumferential speed V at the discharge opening due to the rotation of the chuck device calculated by a following formula ranges from 1.9 m/s to 64.1 m/s.

$$V=(n \times Dc \times \pi)/(60 \times 10^3) \text{[m/s]} \qquad \text{[Formula 2]}$$

n: rotational speed of chuck device (min$^{-1}$)
Dc: diameter of virtual circle defined by rotation trajectory of center of discharge opening (mm)
π: circular constant With the above-described arrangement, for the circumferential speed V at the discharge opening due to the rotation of the chuck device calculated by Formula 2 and the angle θ for setting the discharging direction of the working fluid, respective numerical ranges are specified. Here, comparison between Formula 2 for calculating the circumferential speed V and Formula 1 for calculating the angle θ show that the numerators of both these formulae are same (n×Dc×π) and the circumferential speed V and the angle θ have a proportional relationship of the greater the circumferential speed V, the greater the angle θ. Thus, by associating the circumferential speed V with the angle θ, an appropriate angle θ based on the circumferential speed V can be set easily.

DESCRIPTION OF EMBODIMENTS

Next, embodiments of a chuck device relating to the present invention will be explained with reference to the accompanying drawings.

Figure 1:
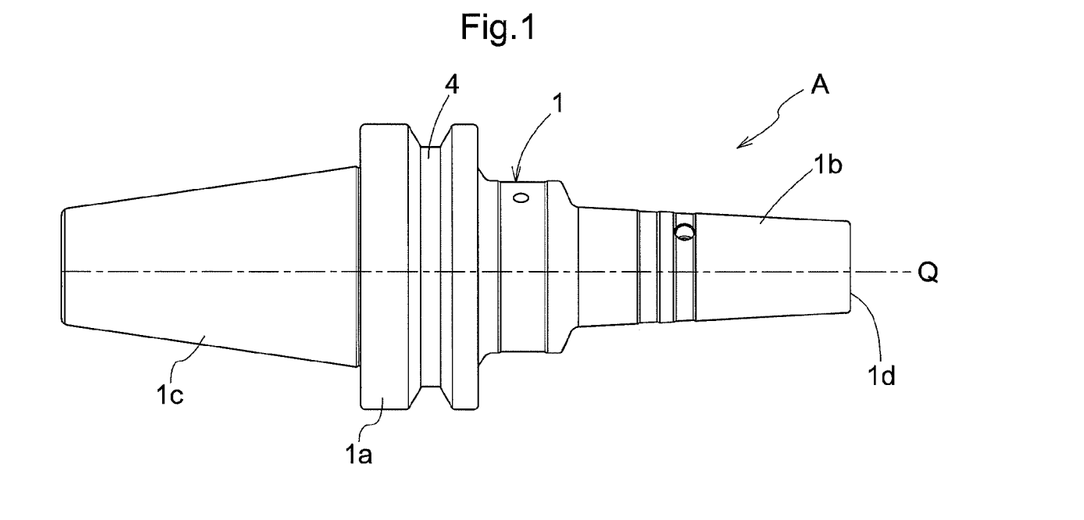
FIG. 1 is a side view of a chuck device.

A chuck device A shown in FIG. 1 is mounted on a spindle of a machine tool in such a manner that the axis of the spindle and the axis Q of the chuck device A are coaxial (in agreement). Further, to this chuck device A, a cutting tool B (see FIG. 2) will be inserted from the right side in FIG. 1 and gripped coaxially with the axis Q. With this, the axis of the spindle and the axis of the cutting tool B will be brought into agreement.

A body 1 of the chuck device A includes a chuck body 1a, a chuck cylinder 1b and a shank 1c. The chuck cylinder 1b is formed on the leading end side of the chuck body 1a. The shank 1c is formed on the rear end side of the chuck body 1a and attached to the spindle of the machine tool.

Figure 2:
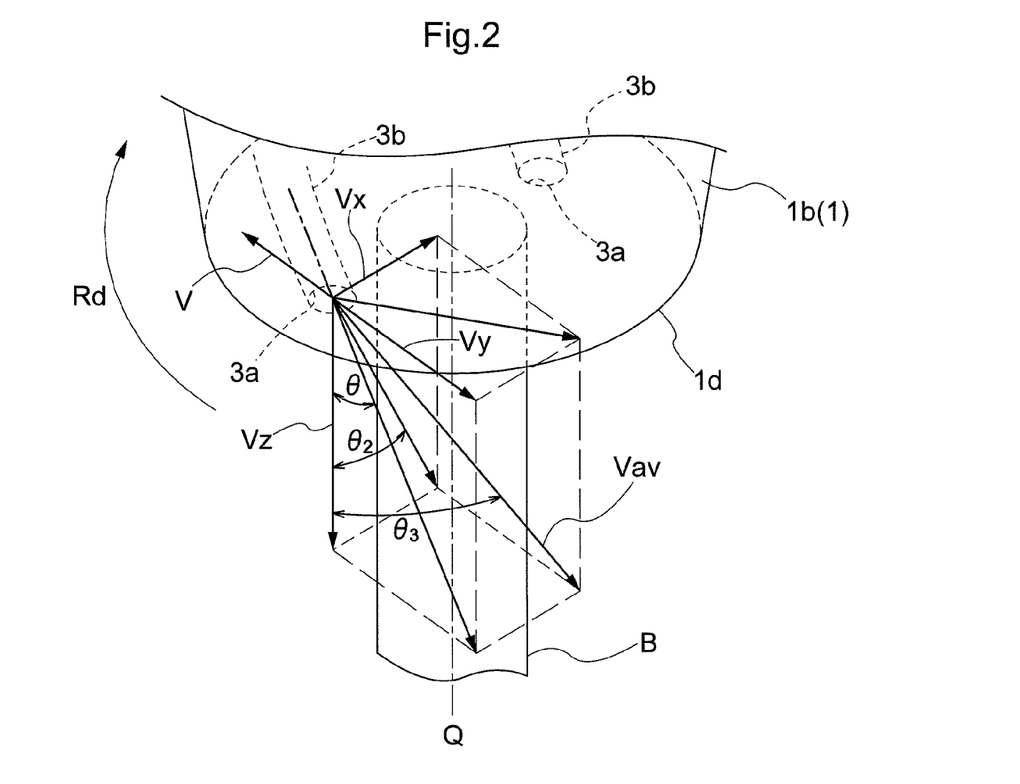
FIG. 2 is a perspective view for explaining a discharging direction of the chuck device.

In the chuck cylinder 1b, there is formed a hole portion (not shown) for griping the cutting tool B (see FIG. 2) along the direction of the axis Q. As shown in FIG. 2, inside the chuck cylinder 1b, there is provided a coolant discharge passage 3b (an example of a "passage") through which coolant (an example of a "working fluid") flows. This coolant discharge passage 3b extends in the direction of the axis Q and is communicated with a coolant supplying passage (not shown) provided separately in the chuck cylinder 1b. The coolant supplying passage is e.g. a passage formed through the inside of the body 1 along the axial direction of the body 1. The coolant discharge passage 3b is provided in a plurality along the circumferential direction of the body 1 (two coolant discharge passages 3b are provided in the instant embodiment). At the leading end of the body 1 in each coolant discharge passage 3b, a discharge opening 3a is formed. Namely, at a leading end face 1d of the body 1 (chuck cylinder 1b), there are provided a plurality of discharge openings 3a opened in a circular shape (two discharge openings 3a in the instant embodiment). As the plurality of discharge openings 3a are arranged equidistantly in the circumferential direction of the body 1, coolant can be sprayed uniformly around the cutting tool B.

Here, for reliable supplying of the coolant to the cutting tool B, the discharging directions of the coolant need to be set appropriately at the discharge openings 3a provided at the leading end of the body 1. When the coolant is to be discharged from the discharge openings 3a of the chuck device A toward the cutting tool B, the discharged coolant will be subjected to the greater influence from the rotational force of the chuck device A, the higher this rotational speed of the chuck device A. For this reason, the discharged coolant will be scattered about in directions away from the axis Q of the cutting tool B. Then, as shown in FIG. 2, the discharging directions of the coolant are set to directions opposite to the rotational direction Rd of the cutting tool B (chuck device A). Specifically, as shown in FIG. 2, the discharging direction of the coolant is set such that a circumferential speed Vy will be effective in the direction opposite to the rotational direction Rd relative to a circumferential speed V in the rotational direction Rd at the discharge opening 3a. And, the discharging direction of the coolant is set such that the direction is set with a tilt of a predetermined angle θ to a tangential direction (direction of the circumferential speed Vy) of a rotation trajectory (virtual circle 5) of the center of the discharge opening 3a at the time of rotation of the chuck device A on the basis of the direction of the axis Q of the cutting tool B.

In this way, the discharging direction of the coolant is set opposite to the rotational direction Rd of the cutting tool B (chuck device A) and with appropriate setting of the tilt angle θ relative to the direction of the axis Q of the cutting tool, the influence of the rotational force of the chuck device A to the discharged coolant can be offset. As a result, even when the chuck device A is rotated at a high speed, scattering of the coolant discharged from the discharge openings 3a to the radial outer side of the cutting tool B can be suppressed. Here, a formula for obtaining the angle θ for suppressing such scattering of coolant will be considered.

An average flow rate (velocity) Vav (m/x) of coolant flowing through the inside of the chuck device A can be calculated from Formula 3 below with using a coolant pressure (MPa) at the discharge opening 3a.

$$V_{av} = \sqrt{2 \times P \times 10^3} \qquad \text{[Formula 3]}$$

Figure 3:
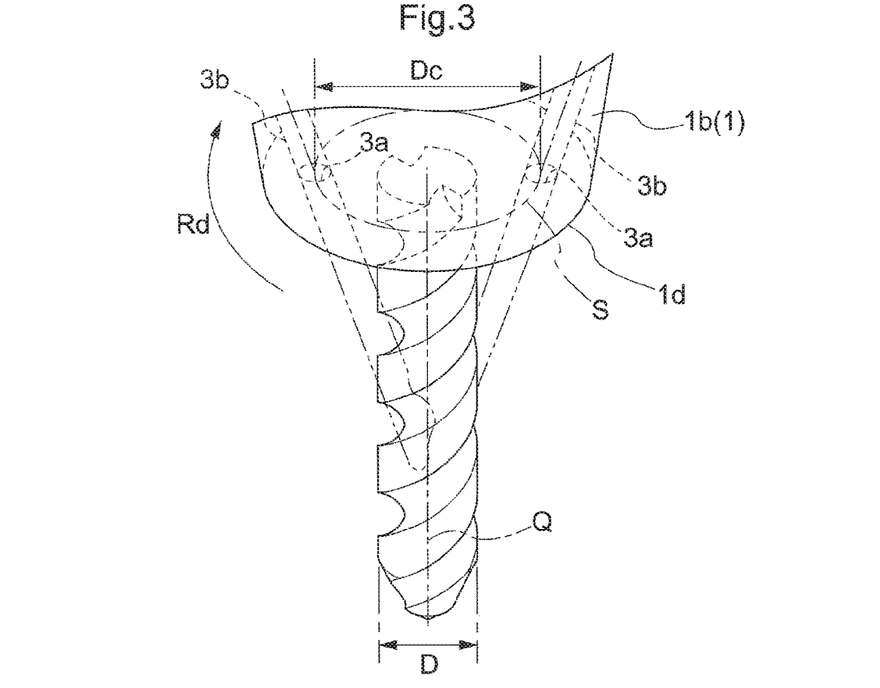
FIG. 3 is a view for explaining a position of a discharge opening in the chuck device.

The circumferential speed V (m/s) at the discharge opening 3a due to the rotation of the chuck device A can be obtained by Formula 4 below from a rotational speed: n (min$^{-1}$) of the chuck device A, a diameter: Dc (mm) of a virtual circle S formed by the rotation trajectory of the center of the discharge opening 3a (see FIG. 3) and the circular constant π.

$$V=(n \times Dc \times \pi)/(60 \times 10^3) \qquad \text{[Formula 4]}$$

Here, an angle θ3 (see FIG. 2) for discharging coolant from the discharge opening 3a toward the cutting tool B can be obtained from Formula 5 below with using an angle θ

Figure 4:
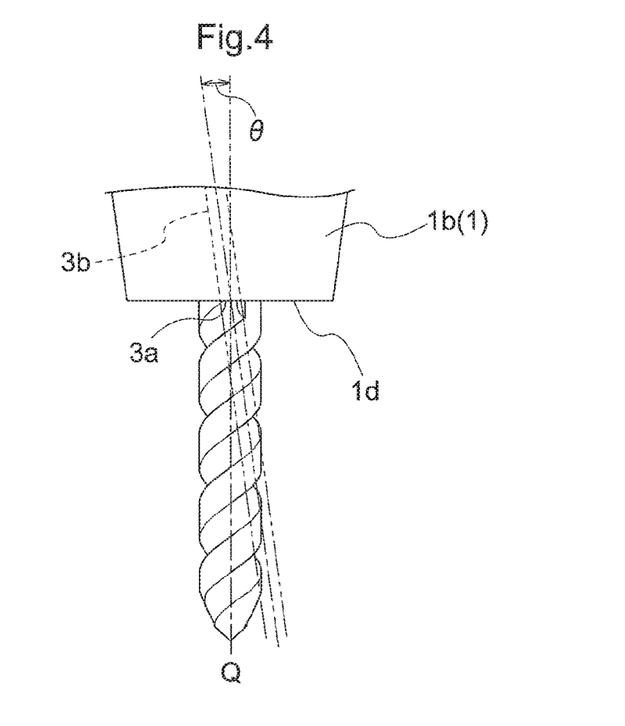
FIG. 4 is a view for explaining an angle θ for setting the discharging direction of working fluid.
Figure 5:
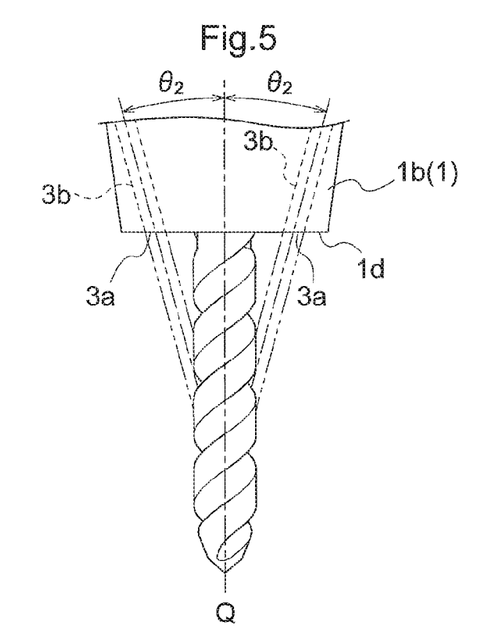
FIG. 5 is a view for explaining an angle θ2 for discharging the working fluid toward an axis of a cutting tool.

(see FIG. 2 and FIG. 4) set for tilting to the opposite side to the rotational direction Rd in the tangential direction to the rotation trajectory of the discharge opening 3a relative to the direction of the axis Q and an angle θ2 (see FIG. 2 and FIG. 5) set for tilting to the direction (direction of Vx) from the discharge opening 3a toward the axis Q relative to the direction of the axis Q.

$$\theta 3 = \tan^{-1}(\sqrt{\tan^2\theta + \tan^2\theta 2})  \quad\text{[Formula 5]}$$

On the other hand, a velocity vector of coolant discharged from the discharge opening 3a can be decomposed into a velocity vector Vx from the discharge opening 3a toward the axis Q of the cutting tool B, a velocity vector Vy in the direction opposite to the velocity vector V in the tangential direction of the rotation trajectory (virtual circle S) and a velocity vector Vz in the direction of the axis Q of the cutting tool B; and the velocities Vx, Vy, Vz can be obtained respectively by following Formulae 6-8 using the angles θ, θ2 and θ3.

$$V_x = Vav \times \cos\theta 3 \times \tan\theta 2 \quad\text{[Formula 6]}$$

$$Vy = Vav \times \cos\theta 3 \times \tan\theta \quad\text{[Formula 7]}$$

$$Vz = Vav \times \cos\theta 3 \quad\text{[Formula 8]}$$

If the velocity vector V in the rotational direction Rd and the velocity vector Vy in the opposite direction to the rotational direction Rd are equal to each other and Vx>0, then, the velocity vector Vxy in the discharging direction includes only the velocity vector Vx, so the coolant is discharged toward the axis Q of the cutting tool B.

The angle θ2 set for discharging coolant toward the center of the cutting edge of the cutting tool B varies according to the length of the cutting tool B protruding from the chuck device A. However, since the cutting tool B needs to have an appropriate length for machining a work or the like, the angle θ2 will be set normally to about 15 degrees at most. If the angle θ2 is 15 degrees or less, then, it may be taken as cos θ3 cos θ and its error range will be confined within 4% or less.

Then, on the premise of cos θ3≒cos θ and ignoring the above error, with substitution thereof into the above-described Formula 7 for calculating the speed (circumferential speed) Vy in the reverse rotational direction, Formula 9 below is obtained.

$$Vy = Vav \times \cos\theta \times \tan\theta = Vav \times \sin\theta \quad\text{[Formula 9]}$$

In case the circumferential speed V in the rotational direction Rd and the circumferential speed Vy in the reverse rotational direction are equal, by substituting the circumferential speed V of the above Formula 4 into the Formula 9 above, Formula 10 below can be derived. By substituting Vav (average flow rate of coolant flowing inside the chuck device A) of Formula 3 above into Formula 10, Formula 11 can be derived and then from this Formula 11, Formula 12 for obtaining the angle θ can be derived.

$$(n \times Dc \times \pi)/(60 \times 10^3) = Vav \times \sin\theta \quad\text{[Formula 10]}$$

$$(n \times Dc \times \pi)/(60 \times 10^3) = \sqrt{2 \times P \times 10^3} \times \sin\theta \quad\text{[Formula 11]}$$

$$\theta = \sin^{-1}((n \times Dc \times \pi)/(12 \times 10^5 \times \sqrt{5P})) \quad\text{[Formula 12]}$$

n: rotational speed of chuck device (min$^{-1}$)
Dc: diameter of virtual circle defined by rotation trajectory of center of discharge opening (mm)
P: working fluid pressure at discharge opening (MPa)
π: circular constant Namely, when setting the discharging direction of coolant in the chuck device A, using an angle θ calculated by the above Formula 12 results in discharging of the coolant from the discharge opening 3a in the direction of the axis Q of the cutting tool B.

Moreover, with appropriate setting of the angle θ2 for causing the discharging direction of coolant to be directed toward the axis Q of the cutting tool B, the coolant discharged from the discharge opening 3a can be readily supplied toward the cutting tool B.

Example 1

The cutter diameter D of the cutting tool B to be gripped by the chuck device A was varied between 3 mm or less to 32 mm. The rotational speed of the chuck device A was set in correspondence with cutting speed range from 100 to 500 m/min. However, if the cutter diameter D becomes less than 3 mm, a special machine tool will be needed which can cope with high speeds in order to satisfy the cutting speed ranging from 100 to 500 m/min. Thus, in the case of the cutter diameter less than 3 mm, the rotational speed of the chuck A was set to the range of from 10,000 to 50,000 min$^{-1}$ possible with a standard machine tool.

In correspondence with the cutter diameter D, the range of the diameter Dc of the virtual circle S formed by the rotation trajectory of the center of the discharge opening 3a and the range of the rotational speed n of the chuck device A were set. The coolant pressure (working fluid pressure) P at the discharge opening 3a was maintained from 3 to 7 MPa. Ranges of the circumferential speeds V and the angle θ calculated based on these are shown in Table 1 below

TABLE 1

| cutter diameter D [mm] | virtual circle diameter Dc at discharge opening [mm] | rotational speed n [min$^{-1}$] | circumferential speed V [m/s] | discharge opening coolant pressure [MPa] | θ [degrees] |
|---|---|---|---|---|---|
| 3 or less | 6~16 | 10,000~50,000 | 3.1~41.9 | 3~7 | 1.5~32.7 |
| 4 | 8~16 | 8,000~40,000 | 3.3~33.5 | 3~7 | 1.6~25.6 |
| 6 | 10~16 | 5,300~27,000 | 2.8~22.6 | 3~7 | 1.3~17.0 |
| 8 | 12~18 | 4,000~20,000 | 2.5~18.8 | 3~7 | 1.2~14.1 |
| 10 | 14~20 | 3,200~16,000 | 2.3~16.7 | 3~7 | 1.1~12.5 |
| 12 | 16~22 | 2,700~13,000 | 2.3~15.0 | 3~7 | 1.1~11.1 |
| 16 | 20~26 | 2,000~10,000 | 2.1~13.6 | 3~7 | 1.0~10.1 |
| 20 | 24~30 | 1,600~8,000 | 2.0~12.6 | 3~7 | 1.0~9.3 |
| 25 | 29~35 | 1,300~6,400 | 2.0~11.7 | 3~7 | 1.0~8.7 |
| 32 | 36~42 | 1,000~5,000 | 1.9~11.0 | 3~7 | 0.9~8.2 |

Example 2

There is disclosed an example using a special machine tool capable of rotating the chuck device A at a high speed without reducing the rotational speed of the chuck device A even when the cutter diameter D is increased. The cutter diameter D was varied from 3 mm or less to 32 mm and in correspondence with such cutter diameter D, the range of the diameter Dc of the virtual circle S formed by the rotation trajectory of the center of the discharge opening 3a was set. The rotational speed n of the chuck device A was maintained in the range from 25,000 to 35,000 min$^{-1}$. The coolant pressure (working fluid pressure) P at the discharge opening 3a was maintained from 3 to 7 MPa. Ranges of the circumferential speeds V and the angle θ calculated based on these are shown in Table 2 below

TABLE 2

| cutter diameter D [mm] | virtual circle diameter Dc at discharge opening [mm] | rotational speed n [min$^{-1}$] | circumferential speed V [m/s] | discharge opening coolant pressure [MPa] | θ [degrees] |
|---|---|---|---|---|---|
| 3 or less | 6~16 | 25,000~35,000 | 7.9~29.3 | 3~7 | 3.8~22.2 |
| 4 | 8~16 | 25,000~35,000 | 10.5~29.3 | 3~7 | 5.1~22.2 |
| 6 | 10~16 | 25,000~35,000 | 13.1~29.3 | 3~7 | 6.4~22.2 |
| 8 | 12~18 | 25,000~35,000 | 15.7~33.0 | 3~7 | 7.6~25.2 |
| 10 | 14~20 | 25,000~35,000 | 18.3~36.6 | 3~7 | 8.9~28.2 |
| 12 | 16~22 | 25,000~35,000 | 20.9~40.3 | 3~7 | 10.2~31.4 |
| 16 | 20~26 | 25,000~35,000 | 26.2~47.6 | 3~7 | 12.8~38.0 |
| 20 | 24~30 | 25,000~35,000 | 31.4~55.0 | 3~7 | 15.4~45.2 |
| 25 | 29~35 | 25,000~35,000 | 37.9~64.1 | 3~7 | 18.7~55.9 |

Other Embodiments (1) The chuck device relating to the present invention can be embodied irrespectively of its type, with any chuck device attached to a spindle of a machine tool for gripping a cutting tool.

(2) The disposing positon of the coolant discharge opening 3a for the coolant in the chuck device A is not limited to the leading end face 1d of the chuck cylinder 1b, but may be in a nut member or a colette in correspondence with a manner of gripping the cutting tool B or in a cover member to be connected to a leading end face 1d of the chuck cylinder 1b or to the colette or the like. In this way, the discharge opening 3a for the coolant is not limited by the above-described embodiments, but can be provided as desired within a range capable of achieving the object of the present invention.

Figure 6:
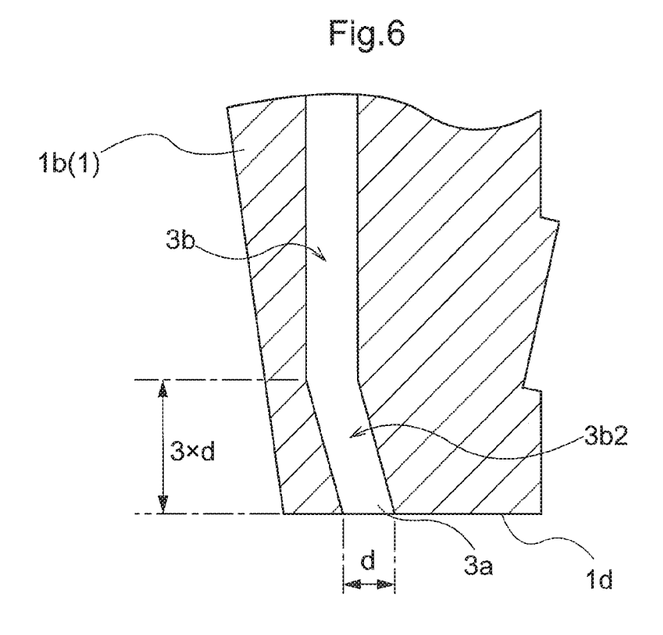
FIG. 6 is a view showing a passage and a discharge opening in a further embodiment.
Figure 7:
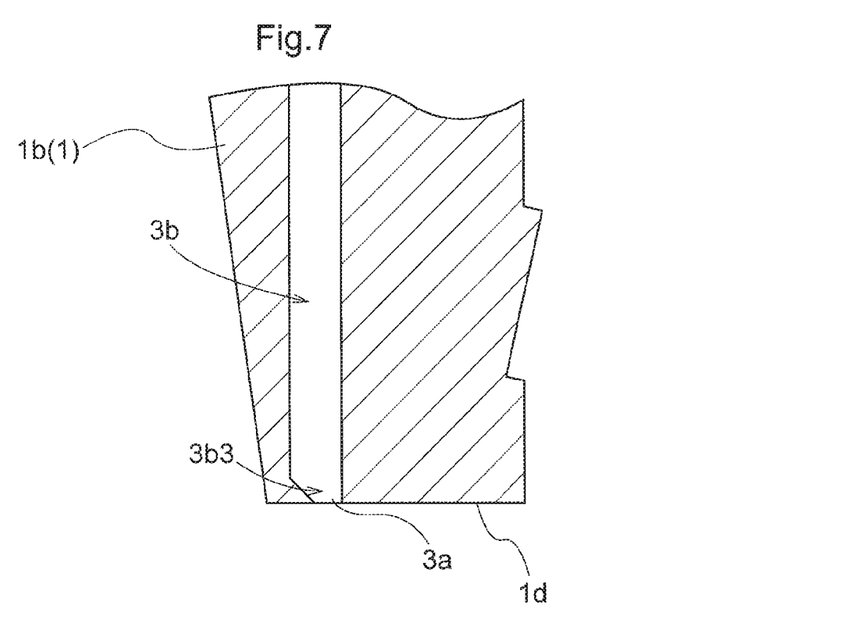
FIG. 7 is a view showing a passage and a discharge opening in a further embodiment.

(3) In the foregoing embodiment, there was disclosed an example in which the coolant discharge passage 3b as a whole is tilted relative to the axis Q. Instead of this, as shown in FIG. 6, of the coolant discharge passage 3b, a partial area 3b2 thereof continuous with the discharge opening 3a may be tilted relative to the axis Q so as to be aligned with the discharging direction based on the angle θ. In FIG. 6, the partial area 3b2 has a length set to be three times as long as the diameter d of the discharge opening 3a. In this way, for the purpose of causing the coolant to be discharged along the passage of discharging direction based on the angle θ, it is preferred that the passage length of the partial area 3b2 be equal to or longer than three times the diameter d of the discharge opening 3a. As shown in FIG. 7, it is also possible to arrange such that of the coolant discharge passage 3b, a flow passage of a partial area 3b3 thereof continuous with the discharge opening 3a be formed narrower than the passage of the other area, so as to cause the coolant to be discharged along the discharging direction based on the angle θ. In FIG. 7, the partial area 3b3 is formed progressively narrower as it approaches the discharge opening 3a.

In this way, by forming a partial area 3b2, 3b3 continuous with the discharge opening 3a of the coolant discharge passage 3b to be aligned with the discharging direction based on the angle θ, the coolant can be discharged from the discharge opening 3a toward the cutting tool B. Further, if only the partial area 3b2, 3b3 of the coolant discharge passage 3b is formed along the discharging direction of the coolant, the other area of the coolant discharge passage 3b than the partial area 3b2, 3b3 can be formed e.g. along the axial direction of the chuck device A. With this, even when the angle θ for setting the discharging direction of the coolant is large, it is still possible to reduce the occupying area of the coolant discharge passage 3b in the circumferential direction of the chuck device A. As a result, in the chuck device A, the coolant discharge passage 3b can be disposed easily.

INDUSTRIAL APPLICABILITY

The present invention can be used for a wide variety of chuck devices configured to supply working fluid to a tool.

REFERENCE SIGNS LIST

1: body
1b: chuck cylinder
1d: leading end face
3a: discharge opening
3b: coolant discharge passage (passage)
3b2: partial area
3b3: partial area
A: chuck device
B: cutting tool
D: cutter diameter
Dc: diameter of virtual circle formed by rotation trajectory of center of discharge opening
Rd: rotational direction
Q: axis
S: virtual circle
θ: angle for tilting discharging direction of working fluid to tangential direction of rotational direction
θ2: angle for tilting discharging direction of working fluid toward axis θ3: discharging angle of working fluid based on axial direction

The invention claimed is:

1. A chuck device configured to be attached to a spindle of a machine tool for gripping a cutting tool, wherein:
   inside the chuck device, there are provided a passage in which a working fluid flows and a discharge opening provided at a leading end opening of the passage through which the working fluid is discharged toward to the cutting tool; and
   a discharging direction of the working fluid from the discharge opening is set opposite to a rotational direction of the cutting tool and set with a tilt of an angle θ calculated by a following formula to a tangential direction of a rotation trajectory of the center of the discharge opening relative to a direction of an axis of the cutting tool, $$\theta = \sin^{-1}((n \times Dc \times \pi)/(12 \times 10^5 \times \sqrt{5P})) \quad \text{[Formula 1]}$$

n: rotational speed of chuck device (min$^{-1}$)
Dc: diameter of virtual circle defined by rotation trajectory of center of discharge opening (mm)
P: working fluid pressure at discharge opening (MPa)
π: circular constant.

2. The chuck device of claim 1, wherein the discharging direction is set to be directed toward the axis of the cutting tool.

3. The chuck device of claim 1, wherein the angle θ is set to from 0.9 degree to 55.9 degrees when a circumferential speed V at the discharge opening due to the rotation of the chuck device calculated by a following formula ranges from 1.9 m/s to 64.1 m/s, $$V = (n \times Dc \times \pi)/(60 \times 10^3) \text{[m/s]} \quad \text{[Formula 2]}$$

n: rotational speed of chuck device (min$^{-1}$)
Dc: diameter of virtual circle defined by rotation trajectory of center of discharge opening (mm)
π: circular constant.

4. The chuck device of claim 2, wherein the angle θ is set to from 0.9 degree to 55.9 degrees when a circumferential speed V at the discharge opening due to the rotation of the chuck device calculated by a following formula ranges from 1.9 m/s to 64.1 m/s, $$V = (n \times Dc \times \pi)/(60 \times 10^3) \text{[m/s]} \quad \text{[Formula 2]}$$

n: rotational speed of chuck device (min$^{-1}$)
Dc: diameter of virtual circle defined by rotation trajectory of center of discharge opening (mm)
π: circular constant.

* * * * *